US008744017B2

(12) United States Patent
Hu et al.

(10) Patent No.: US 8,744,017 B2
(45) Date of Patent: Jun. 3, 2014

(54) DEMAPPING FOR HIERARCHICAL QUADRATURE AMPLITUDE MODULATION

(75) Inventors: Zixia Hu, Seattle, WA (US); Hui Liu, Clyde Hill, WA (US)

(73) Assignee: CMMB Vision USA Inc., Hong Kong (HK)

( * ) Notice: Subject to any disclaimer, the term of this patent is extended or adjusted under 35 U.S.C. 154(b) by 15 days.

(21) Appl. No.: 13/411,039

(22) Filed: Mar. 2, 2012

(65) Prior Publication Data

US 2013/0230125 A1 Sep. 5, 2013

(51) Int. Cl.
*H04L 27/06* (2006.01)

(52) U.S. Cl.
USPC ........... 375/341; 375/219; 375/220; 375/260; 375/316; 375/329; 714/794; 714/795; 714/796

(58) Field of Classification Search
USPC ................. 375/219, 220, 260, 316, 329, 341; 714/794, 795, 796
See application file for complete search history.

(56) References Cited

U.S. PATENT DOCUMENTS

| 7,154,936 B2* | 12/2006 | Bjerke et al. ................. | 375/148 |
| 7,668,125 B2* | 2/2010 | Kadous .......................... | 370/310 |
| 7,701,917 B2* | 4/2010 | Mantravadi et al. .......... | 370/343 |
| 7,724,838 B2* | 5/2010 | Mantravadi ................... | 375/295 |

OTHER PUBLICATIONS

S. Wang et al., "On Enhancing Hierarchical Modulation," LG Electronics Mobile Research, USA, Aug. 17, 2007,; 23 pages.
J. Wu, "Non-uniform and Large Distance Constellation Design for Hierarchical Modulation," 2010 IEEE International, 5 pages.
B. Liu et al., "DPC-Based Hierarchical Broadcasting: Design and Implementation," IEEE Transactions aon Vehicular Technology, vol. 57, No. 6, Nov. 2008, 6 pages.
X. Zhe et al., "A Turbo Iteration Algorithm in 16QAM Hierarchical Modulation," Author manuscript published in, "IEEE International Conference on Wireless Communicaitons, Networking and Iformation Security (WWCNIS), Beijing: China (2010)", Hal-00569107, version 1—Feb. 24, 2011, 4 pages.
R. Dinis et al, On the Design of Turbo Equalizers for SC-FDE Schemes with Different Error Protections, 2010 IEEE, 5 pages.
N. Souto et al., "An Iterative Receiver for WCDMA Systems with MIMO Transmissions and Hierarchical Constellations," 2006 IEEE Ninth International Symposium on Spread Spectrum Techniques and Applicatons, 2006, 5 pages.
N. Souto et al., "Transmitter/Receiver Method for Supporting Hierarchical Modulations in MBMS Transmissions," Wireless Pers Commun (2008) vol. 45, Published online: Sep. 25, 2007, Springer Science+Business Media, LLC, 2007, 21 pages.

* cited by examiner

*Primary Examiner* — Leon Flores
(74) *Attorney, Agent, or Firm* — Fulbright & Jaworski LLP

(57) ABSTRACT

A method and system for demapping a hierarchical signal is disclosed. The method includes receiving a hierarchical signal comprising first and second encoded, modulated signals. A conditional probability relating to the structure of the second encoded, modulated signal is determined. The hierarchical signal is demodulated using the conditional probability to generate a first encoded data stream. The first encoded data stream is decoded to recover information bits.

26 Claims, 2 Drawing Sheets

DEMAPPING FOR HIERARCHICAL QUADRATURE AMPLITUDE MODULATION

TECHNICAL FIELD

The invention relates generally to digital communication, and more particularly to a demapping technique for Quadrature Amplitude Modulation (QAM) symbols.

BACKGROUND OF THE INVENTION

In a digital communication system, information bits (also referred to as a data stream) may be transmitted over a carrier signal by modulating the carrier signal using various modulation schemes. A known modulation scheme is QAM which maps the data stream to complex symbol constellations, such as 16 QAM, 64 QAM, and 256 QAM, for modulating a carrier signal. A demapping operation is carried by a receiver to recover the data stream.

In a hierarchical modulation, also called a layered modulation, multiple data streams are modulated into a single symbol stream. For example, two separate layers may be modulated into a single stream in which a basic layer, often called a high priority stream, may be embedded in an enhanced layer, often called a low priority stream. Receivers with good reception can receive both streams, while those with poor reception may only receive the high priority stream. Broadcasters can target two different types of receivers with different services. Typically the low priority stream offers additional information, but lower robustness than the high priority stream. For example, a broadcaster may deliver a secondary program in the low priority stream. Alternatively, the low priority stream and the high priority stream may be combined to offer high definition television (HDTV) signal.

FIG. 1 illustrates a block diagram of digital communication system 100 employing hierarchical modulation. The digital communication system comprises transmitter 104 which communicates wirelessly with receiver 108.

At transmitter 104, a first sequence of information bits $\{U1\}$ is encoded by first encoder 112A. First encoder 112A yields a first sequence of coded bits $\{V1\}$. Similarly, a second sequence of information bits $\{U2\}$ is encoded by second encoder 112B. Second encoder 112B yields a second sequence of coded bits $\{V2\}$. First and second encoders 112A and 112B may each be a low density parity check (LDPC) encoder.

The first and second sequence of coded bits $\{V1\}$ and $\{V2\}$ are fed into first and second QAM mappers 120A and 120B, respectively. QAM mappers 120A and 120B transform the bits $\{V1\}$ and $\{V2\}$ into QAM symbols $\{X1\}$ and $\{X2\}$, respectively. The modulated symbols $\{X1\}$ and $\{X2\}$ are amplified by power amplifiers 124A and 124B to yield sequences of symbols $\sqrt{P1}\{X1\}$ and $\sqrt{P2}\{X2\}$, respectively. The sequences of symbols P1 $\{X1\}$ and P2$\{X2\}$ are summed at summer 136 and the resulting stream may be expressed as:

$$\{X\} = \sqrt{P1}\{X1\} + \sqrt{P2}\{X2\}$$

The resulting stream $\{X\}$ is subsequently transmitted by transmitter 104 over the air. Assuming a channel coefficient H and noise in the channel W, the received signal at receiver 108 can be expressed by a series of QAM symbols $\{Y\}$, where $$\{Y\} = H \cdot X + W$$

The received signal $\{Y\}$ is demodulated by demapper 144 to produce a demodulated stream $\{L(V1)\}$ which is subsequently decoded by decoder 152 to obtain a sequence of information bits $\{D\}$. Decoder 152 may be a LDPC decoder. The demodulated stream $\{L(V1)\}$ may be expressed as:

$$\{L(V1)\} = \log \frac{P[V_1 = 0 \mid y_k]}{P[V_1 = 1 \mid y_k]}$$

Traditional hierarchical modulation suffers from interference between layers, which results in both capacity loss and bit error rate increase. Also, traditional demapping applied to a hierarchical signal recovers a first layer by removing or filtering out a second layer without considering the structure of the second layer.

BRIEF SUMMARY OF THE INVENTION

According to embodiments of the invention, a first layer (e.g., basic layer) of a hierarchical signal is demapped by incorporating the knowledge with respect to the modulation of one or more remaining layers (e.g., $2^{nd}$ to Nth layers) in the hierarchical signal. Thus, the demapping scheme according to the embodiments does not ignore the one or more remaining layers, but rather incorporates the knowledge with respect to the modulation of the one or more remaining layers to facilitate demodulation of the first layer.

According to embodiments of the invention, a method includes receiving a hierarchical signal comprising first and second encoded, modulated signals. The hierarchical signal may be generated at a transmitter by modulating first and second data streams into a single symbol stream. For example, the first data stream (e.g., base layer) into which the second data stream (e.g., enhanced layer) may be modulated to form a single stream.

According to embodiments of the invention, the knowledge with respect to modulation of the second encoded, modulated signal is used during demodulation of the first encoded, modulated signal. The second encoded, modulated signal is not treated merely as noise. Rather, the second encoded, modulated signal which has a known structure may be more easily mitigated when decoding the first stream by using a conditional probability, also referred to as the knowledge, of the second encoded, modulated signal. By considering the statistics of the second encoded, modulated signal, the first encoded, modulated signal may be detected under lower signal to noise ratio (SNR), thus improving the reception sensitivity. The conditional probability may be determined using all possible constellation points of the second encoded, modulated signal and their associated probabilities.

The method includes demodulating the hierarchical signal using the conditional probability to generate the refined soft information of a first encoded data stream for a LDPC decoder. According to embodiments, the hierarchical signal may be demodulated using a SISO detector to obtain a refined soft information of the first encoded data stream. The first encoded data stream is subsequently decoded to recover information bits by, for example, a low density parity check decoder.

According to embodiments of the invention, a receiver includes a soft input soft output (SISO) detector configured to receive a hierarchical signal. The hierarchical signal includes first and second encoded, modulated signals. The detector demodulates the hierarchical signal using a conditional probability to generate the refined soft information of a first encoded data stream for the LDPC decoder. According to embodiments, the conditional probability may be determined using all possible constellation points of the second encoded, modulated signal and their associated probabilities.

The receiver includes a low density parity check decoder configured to receive the first encoded data stream and operable to decode the first encoded data stream to recover the information bits. According to embodiments, the detector includes a memory configured to retain instructions for determining the conditional probability from a plurality of probable values of the second encoded, modulated signal. The detector also includes a processor coupled to the memory configured to execute the instructions retained in the memory.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
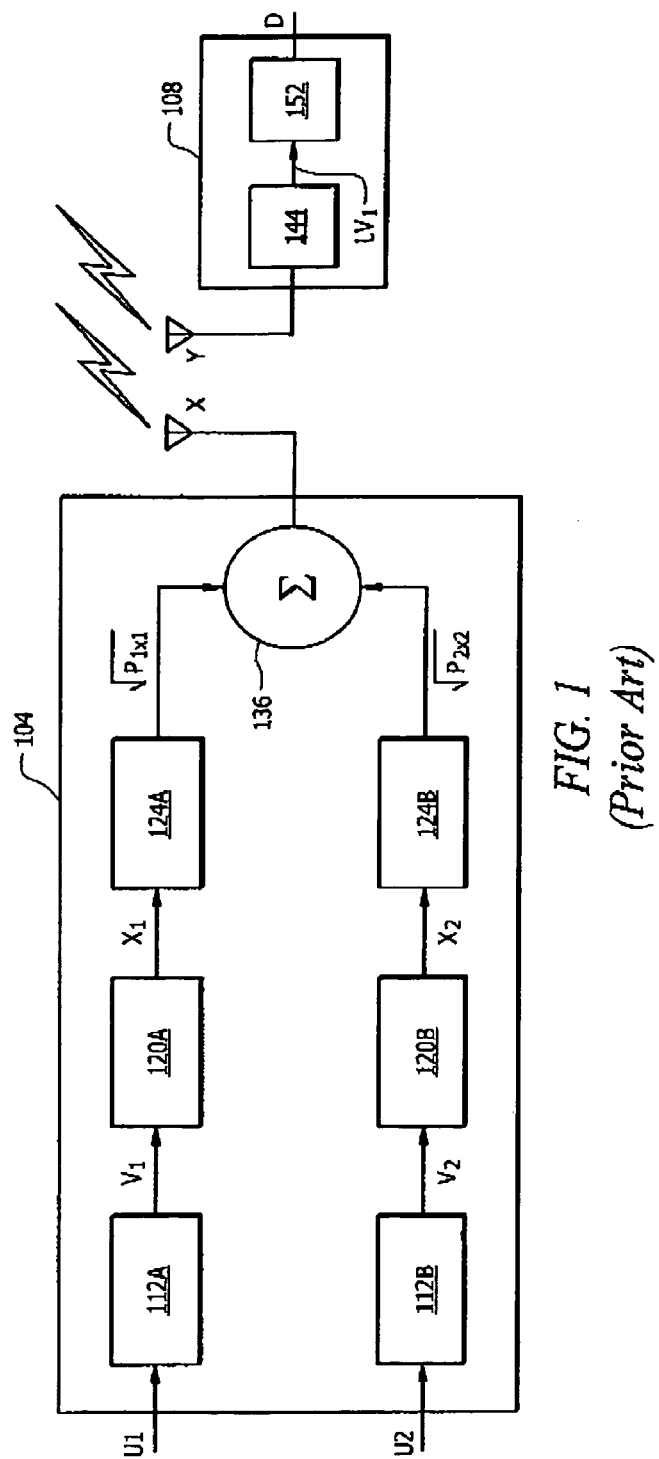
FIG. 1 illustrates a block diagram of digital communication system employing hierarchical modulation.
Figure 2:
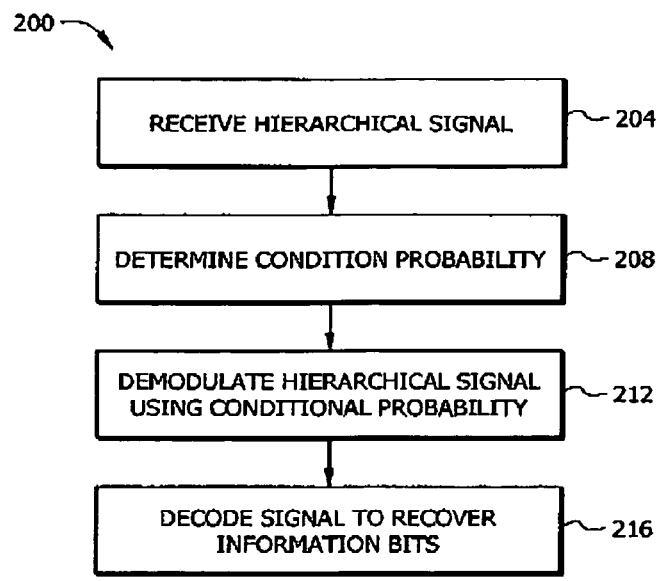
FIG. 2 is flow diagram of a method for demapping a hierarchical signal according to embodiments of the invention.

According to embodiments of the invention, a first encoded, modulated signal (e.g., basic layer) of a hierarchical signal is demapped by incorporating the knowledge with respect to the modulation applied to one or more remaining encoded, modulated signals (e.g., $2^{nd}$ to Nth layers) in the hierarchical signal. The remaining modulated signals are not treated merely as noise. Rather, the remaining modulated signals have a known structure which may be used to refine the soft information for a first layer decoder, thereby increasing the performance of the first layer detection. FIG. 2 is flow diagram 100 of a method for demapping a hierarchical signal according to embodiments of the invention. In step 104, a hierarchical signal is received by a receiver. The hierarchical signal comprises a plurality of encoded, modulated signals. By way of example, the hierarchical signal may comprise a first layer (e.g., basic layer) and a second layer (e.g., enhanced layer).

In step 208, a conditional probability relating to the structure of the second layer is determined. The conditional probability is a function of all possible constellation points of the second layer, which depends on the modulation scheme applied to the second layer by a transmitter. If QSPK modulation scheme is applied to the second layer, the second layer may have four probable values. Thus, the conditional probability may be represented as a sum of the four probable conditions. Accordingly, by incorporating the conditional probability of the second layer into the demodulation, the second layer is easily mitigated which allows easier demodulation of the first layer.

In step 212, the hierarchical signal is demodulated using the conditional probability to generate the refined soft information of a first encoded data stream for a LDPC decoder. More specifically, the conditional probability is used to mitigate the interference caused by the second layer when decoding the first layer, thus allowing robust recovery of the first layer from the hierarchical signal. According to embodiments, the modified soft information may be demodulated using a SISO detector.

In step 216, the first encoded data stream is decoded by a decoder to recover the information bits. According to embodiments, the first encoded data stream is decoded by a LDPC decoder. It will be appreciated that other known decoding scheme may be employed by the decoder to recover the information bits.

Figure 3:
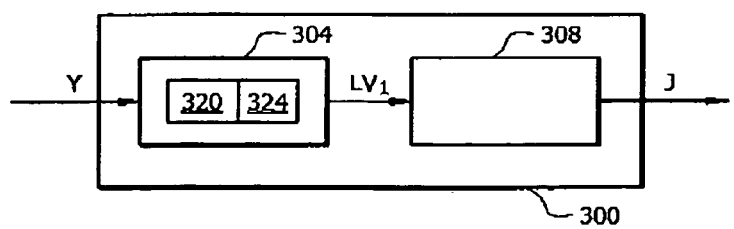
FIG. 3 illustrates a receiver according to embodiments of the invention.

FIG. 3 is a block diagram of receiver 300 which employs the demapping scheme according to the embodiments of the invention. A received signal {Y} is demodulated using demapper 304. According to embodiments, demapper 304 may be a SISO detector. As noted before, the demodulation scheme incorporates the modulation of the second layer by incorporating the conditional probability of the signal distribution of the second layer. It will be appreciated that the invention may be applied to demodulate a hierarchical signal comprising a plurality of layers.

According to embodiments, the modulation schemes applied to the first and second layers may be transmitted from a base station to the receiver. For example, the modulation schemes may be transmitted to the receiver in a header via a control channel. Thus, demapper 304 may apply appropriate demodulation scheme to recover the first layer by using the modulation scheme applied to the second layer. For example, the first layer may be modulated using QPSK while the second layer may be modulated using QAM. Accordingly, demapper 304 may demodulate the hierarchical signal to recover the first layer using QPSK demodulation which incorporates the conditional probability of the signal distribution of the second layer. Thus, if QAM modulation is applied to the second layer by the transmitter, the conditional probability will be all possible constellation points according to QAM modulation.

Referring back to FIG. 3, demapper 304 yields a demodulated stream {L(V1)}, which may be expressed as follows:

$$\{L(V1)\} = \log \frac{P[v_1^i = 0 \mid y_k; x_2^k \text{ has } l_2 \text{ bits}]}{P[v_1^i = 1 \mid y_k; x_2^k \text{ has } l_2 \text{ bits}]}$$

The demodulated stream {L(V1)} is fed to decoder 308 to recover information bits {J}. According to embodiments, decoder 308 is a LDPC decoder.

According to embodiments, demapper 304 includes memory 320 configured to retain instructions for determining the conditional probability from a plurality of probable values of the second encoded, modulated signal. Demapper 304 also includes processor 324 coupled to the memory configured to execute the instructions retained in the memory.

As noted before, hierarchical modulation is susceptible to inter-layer interference which causes capacity loss and increases bit error rate. By incorporating the modulation of the second layer into the demodulation scheme, embodiments of the invention provide improved recovery of the information bits from a hierarchical signal notwithstanding the effects of inter-layer interference. Consequently, a transmitter may be able to transmit at a lower power or increase the bit-rate without degrading the reception quality. Also, the reception range of a receiver may be increased without degrading the reception quality.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   receiving, in a single symbol stream, a hierarchical signal comprising first and second encoded, modulated signals, including a base layer and an enhancement layer;
   determining information relating to the structure of the second encoded, modulated signal, including determining a conditional probability of a signal distribution of the enhancement layer based on a modulation scheme of the enhancement layer; and
   demodulating the hierarchical signal using the information relating to the structure of the second encoded, modulated signal to decode a first encoded data stream, including recovering the base layer using a demodulation which incorporates the conditional probability of the signal distribution of the enhancement layer.

2. The method of claim 1, wherein the information is a conditional probability of all possible constellation points of the second encoded, modulated signal.

3. The method of claim 2, further comprising determining the conditional probability from all possible constellation points of the second encoded, modulated signal.

4. The method of claim 2, further comprising determining the conditional probability from a modulation scheme applied to a second signal by a transmitter.

5. The method of claim 2, further comprising determining the conditional probability from a sum of all possible constellation points of the second encoded, modulated signal.

6. The method of claim 1, further comprising decoding the first encoded data stream by a low density parity check decoder to recover information bits.

7. The method of claim 1, further comprising demodulating the hierarchical signal using a soft input soft output (SISO) detector.

8. The method of claim 1, further comprising modulating a first encoded signal with a quadrature phase shift key modulation to generate the first encoded, modulated signal.

9. The method of claim 1, further comprising modulating a second encoded signal with a quadrature phase shift key modulation to generate the second encoded, modulated signal.

10. The method of claim 7, further comprising encoding a first signal by a low density parity check encoder to generate the first encoded signal.

11. The method of claim 8, further comprising encoding a second signal by a low density parity check encoder to generate the second encoded signal.

12. The method of claim 1, further comprising:
    receiving information regarding the modulation scheme of the enhancement layer and a modulation scheme of the base layer,
    wherein recovering the base layer includes demodulating the hierarchical signal to recover the base layer using the modulation scheme of the base layer and the determined conditional probability of the signal distribution of the enhancement layer.

13. The method of claim 12, wherein receiving the information regarding the modulation scheme of the enhancement layer and the modulation scheme of the base layer includes receiving the information in a header via a control channel.

14. A method comprising:
    receiving, in a single symbol stream, a hierarchical signal comprising first and second encoded, modulated signals, including a base layer and an enhancement layer, the first and second encoded, modulated signals being generated by encoding first and second signals with a low density parity check encoder and modulating the encoded signals with a quadrature phase shift key modulator;
    determining a conditional probability relating to the second encoded, modulated signal from a plurality of probable values of the second encoded, modulated signal, including determining a conditional probability of a signal distribution of the enhancement layer based on a modulation scheme of the enhancement layer; and
    demodulating the hierarchical signal using the conditional probability to generate a soft information of a first encoded data stream, including recovering the base layer using a demodulation which incorporates the conditional probability of the signal distribution of the enhancement layer.

15. The method of claim 14, further comprising demodulating the hierarchical signal using a soft input soft output (SISO) detector.

16. The method of claim 14, further comprising determining the conditional probability of all possible constellation points of the second encoded, modulated signal from a modulation scheme applied to a second signal by a transmitter.

17. The method of claim 14, further comprising decoding the first encoded data stream by a low density parity check decoder to recover information bits.

18. A receiver comprising:
    a soft input soft output (SISO) detector configured to receive, in a single symbol stream, a hierarchical signal comprising first and second encoded, modulated signals, including a base layer and an enhancement layer, and operable to demodulate the hierarchical signal using a conditional probability to generate a first encoded data stream, including determining the conditional probability of the signal distribution of the enhancement layer based on a modulation scheme of the enhancement layer, and recovering the base layer using a demodulation which incorporates the conditional probability of the signal distribution of the enhancement layer; and a low density parity check decoder configured to receive the first encoded data stream and operable to decode the first encoded data stream to generate a soft information of a first decoded data stream.

19. The receiver of claim 18, wherein the SISO detector further comprises:
a memory configured to retain instructions for determining the conditional probability from a plurality of probable values of the second encoded, modulated signal;
a processor coupled to the memory configured to execute the instructions retained in the memory.

20. The receiver of claim 19, wherein the memory further retains instructions related to determining the conditional probability of all possible constellation points of the second encoded, modulated signal from a modulation scheme applied to a second signal by a transmitter.

21. A method comprising:
receiving, in a single symbol stream, a hierarchical signal comprising N encoded, modulated signals, including a base layer and an enhancement layer;
determining respective conditional probabilities of the second to the Nth encoded, modulated signals, including determining a conditional probability of a signal distribution of the enhancement layer based on a modulation scheme of the enhancement layer; and
demodulating the hierarchical signal using the conditional probabilities to generate a soft information of a first encoded data stream, including recovering the base layer using a demodulation which incorporates the conditional probability of the signal distribution of the enhancement layer.

22. The method of claim 21, further comprising determining the conditional probabilities from respective probable values of corresponding encoded, modulated signals.

23. The method of claim 21, further comprising determining the conditional probabilities from a modulation scheme applied to the corresponding signals.

24. The method of claim 21, further comprising decoding the first encoded data stream by a low density parity check decoder to recover information bits.

25. The method of claim 21, further comprising demodulating the hierarchical signal using a soft input soft output (SISO) detector to generate the first encoded data stream.

26. The method of claim 21, wherein N is an integer.

* * * * *